United States Patent
Kapoor et al.

(10) Patent No.: US 9,437,879 B1
(45) Date of Patent: Sep. 6, 2016

(54) OXIDATION PROCESS FOR INTERCONNECTS AND END PLATES

(71) Applicant: Bloom Energy Corporation, Sunnyvale, CA (US)

(72) Inventors: Sanjiv Kapoor, Sunnyvale, CA (US); Michael Gasda, Mountain View, CA (US); Virginia Osterman, Souderton, PA (US); Ken Bauhof, Souderton, PA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 317 days.

(21) Appl. No.: 13/969,787

(22) Filed: Aug. 19, 2013

Related U.S. Application Data (60) Provisional application No. 61/700,135, filed on Sep. 12, 2012.

(51) Int. Cl.
*C23C 8/10* (2006.01)
*H01M 8/02* (2016.01)
*C23C 8/02* (2006.01)

(52) U.S. Cl.
CPC ................................ *H01M 8/0202* (2013.01)

(58) Field of Classification Search
CPC ......... H01M 8/0202; C23C 8/16; C23C 8/18
See application file for complete search history.

(56) References Cited

U.S. PATENT DOCUMENTS

| | | | | |
|---|---|---|---|---|
| 7,390,456 | B2* | 6/2008 | Glatz | C22C 1/045 419/19 |
| 2005/0092399 | A1* | 5/2005 | Ronay | C22C 5/06 148/430 |
| 2009/0269939 | A1* | 10/2009 | Sprey | C23C 8/02 438/773 |
| 2010/0178587 | A1* | 7/2010 | Inoue | H01M 4/8605 429/495 |
| 2012/0244448 | A1* | 9/2012 | Hallum | H01M 8/1097 429/409 |
| 2013/0130154 | A1* | 5/2013 | Darga | H01M 8/0258 429/535 |

* cited by examiner

*Primary Examiner* — Lois Zheng
(74) *Attorney, Agent, or Firm* — The Marbury Law Group PLLC (57) ABSTRACT

Methods and systems for oxidizing an interconnect for a fuel cell stack include introducing at least one interconnect to an oxidizing gas containing water vapor, the oxidizing gas being at least substantially free of nitrogen, and oxidizing the at least one interconnect in the presence of the oxidizing gas at an elevated temperature. The oxidation may be performed at a sub-atmospheric pressure. The oxidation of the interconnect may be a controlled oxidation that is performed prior to incorporating the interconnect into a fuel cell stack.

18 Claims, 6 Drawing Sheets

OXIDATION PROCESS FOR INTERCONNECTS AND END PLATES

CROSS-REFERENCE TO RELATED APPLICATION

This application claims the benefit of priority to U.S. Provisional Patent Application Ser. No. 61/700,135 entitled "Oxidation Process for Interconnects and End Plates" filed Sep. 12, 2012, which is incorporated herein by reference in its entirety.

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

In order to optimize the operation of SOFCs, the oxidizing and fuel flows should be precisely regulated. Therefore, the flow regulating structures, such as interconnects in the fuel cell system should be precisely manufactured.

SUMMARY

Embodiments include methods for oxidizing an interconnect for a fuel cell stack that comprises introducing at least one interconnect to an oxidizing gas comprising water vapor, the oxidizing gas being at least substantially free of nitrogen, and oxidizing the at least one interconnect in the presence of the oxidizing gas at elevated temperature. In various embodiments, the oxidation may be performed at a sub-atmospheric pressure (<760 Torr), such as 100-700 Torr. In various embodiments, the oxidation of the interconnect may be a controlled oxidation that is performed prior to incorporating the interconnect into a fuel cell stack.

Further embodiments include systems for oxidizing one or more interconnects for a fuel cell stack using water vapor.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments include methods and systems for performing controlled oxidation of interconnects and end plates for a fuel cell stack.

Figure 1:
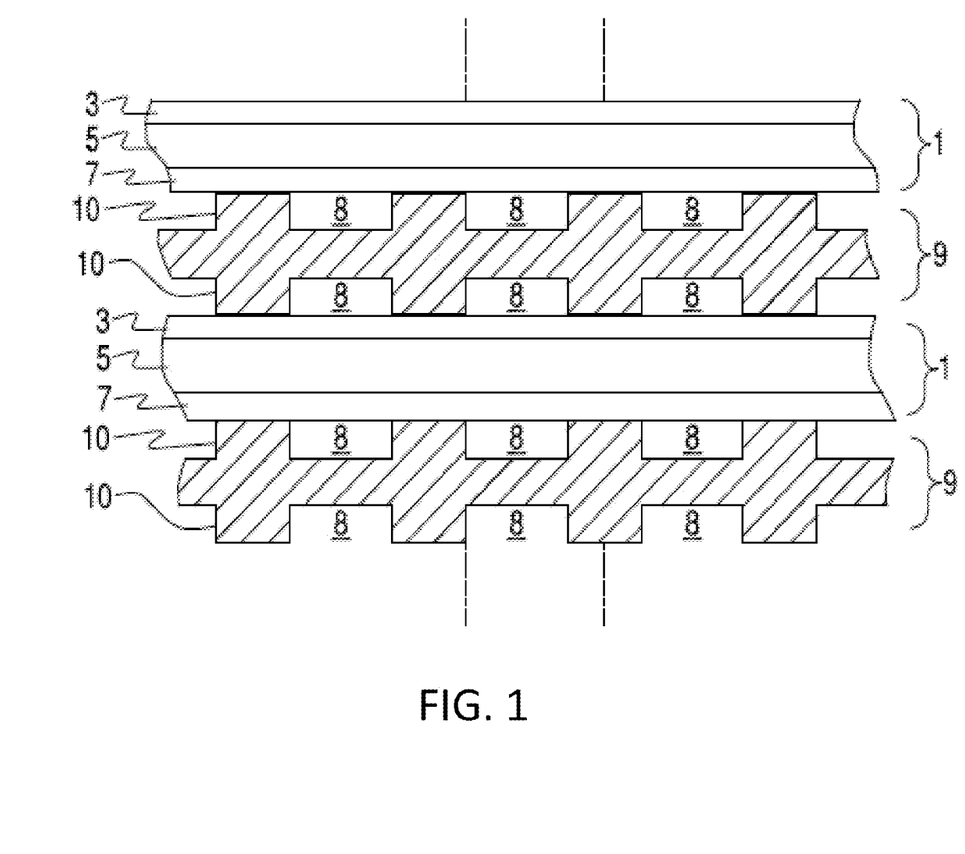
FIG. 1 illustrates a side cross-sectional view of a SOFC stack.

An example of a solid oxide fuel cell (SOFC) stack is illustrated in FIG. 1. Each SOFC 1 comprises a cathode electrode 7, a solid oxide electrolyte 5, and an anode electrode 3. Fuel cell stacks are frequently built from a multiplicity of SOFC's 1 in the form of planar elements, tubes, or other geometries. Fuel and air has to be provided to the electrochemically active surface, which can be large.

The gas flow separator 9 (referred to as a gas flow separator plate when part of a planar stack), containing gas flow passages or channels 8 between ribs 10, separates the individual cells in the stack. Frequently, the gas flow separator plate 9 is also used as an interconnect which electrically connects the anode or fuel electrode 3 of one cell to the cathode or air electrode 7 of the adjacent cell. In this case, the gas flow separator plate which functions as an interconnect is made of or contains electrically conductive material. The interconnect/gas flow separator 9 separates fuel, such as a hydrocarbon fuel, flowing to the fuel electrode (i.e. anode 3) of one cell in the stack from oxidant, such as air, flowing to the air electrode (i.e. cathode 7) of an adjacent cell in the stack. At either end of the stack, there may be an air end plate or fuel end plate (not shown) for providing air or fuel, respectively, to the end electrode. An "interconnect" as used herein refers to both a interconnect/gas flow separator between two adjacent fuel cells in a fuel cell stack as well as to an "end plate" located at an end of a fuel cell stack, unless otherwise specified. FIG. 1 shows that the lower SOFC 1 is located between two interconnects 9.

For solid oxide fuel cell stacks, the interconnect 9 is typically made from an electrically conductive metal material, and may comprise a chromium alloy, such as a Cr—Fe alloy made by a powder metallurgy technique. The powder metallurgy technique may include pressing and sintering a Cr—Fe powder, which may be a mixture of Cr and Fe powders and/or pre-alloyed Cr—Fe powder, to form a Cr—Fe alloy interconnect in a desired size and shape (e.g., a "net shape" or "near net shape" process). A typical chromium-alloy interconnect may comprise at least about 80% chromium by weight, and preferably more than about 90% chromium, such as about 95% chromium. The interconnect may contain less than about 20% iron by weight, and preferably less than about 10% iron, such as about 4-6% iron (e.g., about 5% iron). The interconnect may contain less than about 2% by weight, such as about zero to 1% of other materials, such as yttrium or yttria, as well as residual or unavoidable impurities.

In example method for fabricating interconnects, blended Cr and Fe elemental powders are pressed in a hydraulic or mechanical press to produce a part having the desired interconnect shape. The Cr and Fe powders are blended with an organic binder and pressed into so-called "green parts" using a conventional powder metallurgy technique. The "green parts" have substantially the same size and shape as the finished interconnect (i.e., "near net shape"). The organic binder in the green parts is removed before the parts are sintered. The organic binder is removed in a debinding process in a furnace (e.g., a continuous furnace) that is operated at atmospheric pressure at a temperature of 400° C. to 800° C. under flow of hydrogen gas. After debinding, the compressed powder Cr—Fe interconnects are sintered at high-temperature (e.g., 900° C. to 1500° C.) to promote interdiffusion of the Cr and Fe.

Damage to the cells in a fuel cell stack can be reduced or prevented by exposing the interconnects to an oxidizing ambient, such as air at high temperature, prior to use of the interconnect in the stack. The high temperature air exposure causes oxide formation and the associated geometric distortion of the interconnects prior to the attachment of the seals and the interconnect to the cells, such as to the electrolyte and/or the electrodes of the cells. The oxidation at least partially fills the pores throughout the thickness of the relatively porous powder pressed and sintered interconnect, causing a slight change in length and width (e.g., 0.1-0.5%) of the interconnect. During subsequent heat-ups, e.g., during use of the stack, less (or negligible) distortion due to oxidation occurs and the stresses on the cells are greatly reduced compared to stacks containing non-preoxidized interconnects.

The oxide (e.g., $Cr_2O_3$) is formed by oxidizing the sintered Cr—Fe interconnects in air or $Ar/O_2$ mixtures. The controlled oxidation is typically performed at high temperature (e.g., 950 to 1100° C.) at atmospheric pressure using a continuous furnace. However, under these conditions it has been observed that a competing reaction results in undesirable (chromium) nitridation in the interconnects. These nitrides can block the pores and inhibit uniform oxide formation throughout the thickness of the interconnect. It is desirable to reduce or eliminate nitrides, such as CrN, from oxidized interconnects, since this may adversely effect the performance of the fuel cell stack.

Figure 2:
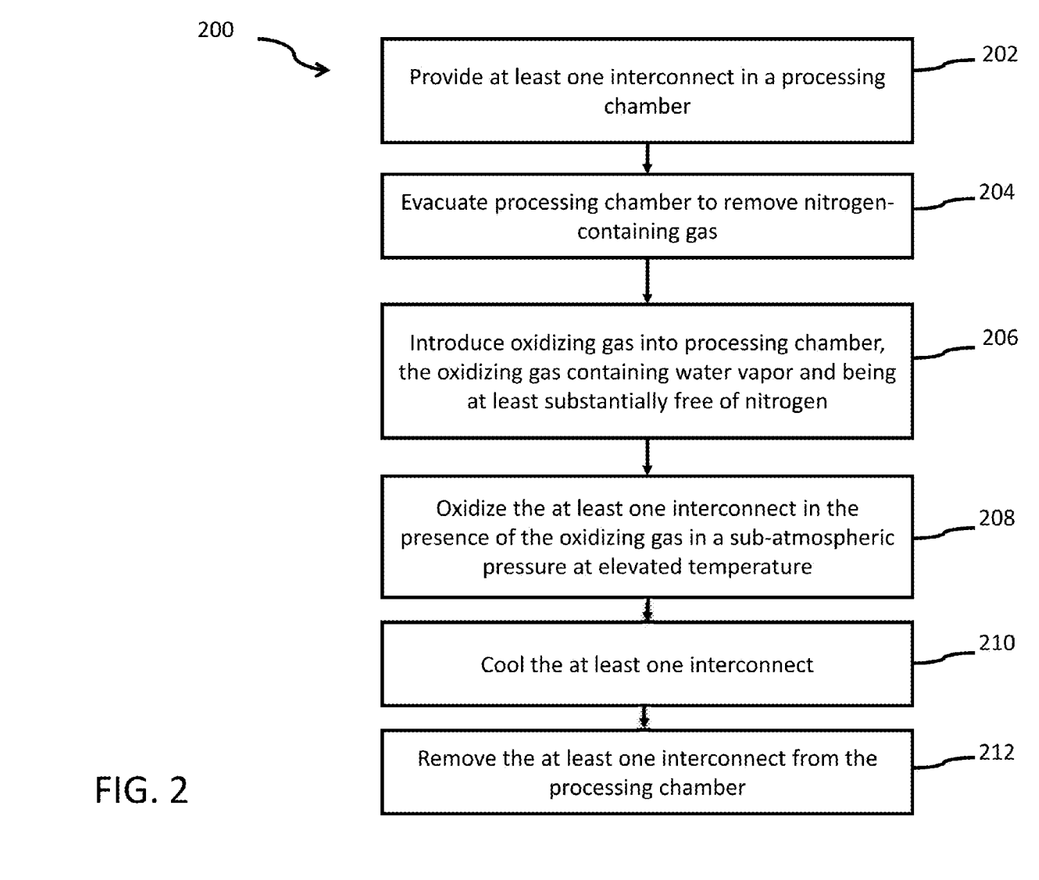
FIG. 2 is a process flow diagram illustrating an embodiment method for performing a controlled oxidation of an interconnect for a fuel cell stack using an oxidant gas comprising water vapor.

FIG. 2 is a process flow diagram illustrating a method 200 for oxidizing an interconnect according to one embodiment. In step 202 of method 200, at least one interconnect may be provided in a process chamber. The at least one interconnect may be formed using a powder metallurgy technique, and may be sintered to promote interdiffusion of constituent metal powders (e.g., Cr and Fe), as described above. In a preferred embodiment, a plurality of sintered interconnects are provided in a process chamber, which may be, for example, a vacuum furnace. The plurality of interconnects may be vertically stacked, interleaved with one or more spacers, such as grooved ceramic tiles, to form an interconnect column. One or more interconnect columns may be placed in a container (e.g., a "retort"), which may be a container made of graphite or another high-temperature material that is adapted to contain vapors from the processed interconnects and prevent contamination of a processing chamber (e.g., a vacuum furnace) and any heating elements associated with the processing chamber. The container may include a gas distribution manifold that is coupled to one or more gas sources for providing a gas or gas mixture to the plurality of interconnects contained within the container. The container containing the plurality of interconnects may be loaded into the processing chamber, such as a vacuum furnace.

In step 204 of method 200, the processing chamber containing the at least one interconnect may be evacuated to remove nitrogen-containing gas from the processing chamber. The processing chamber, such as a vacuum furnace, may be configured to provide a reduced- or sub-atmosphere environment (i.e., below 1 atm, or 760 Torr, pressure). In one embodiment, the processing chamber may be evacuated to a pressure of 0.1 Torr or less, such as $1\times10^{-3}$ Torr or less (e.g., $10^{-3}$ to $10^{-6}$ Torr), to remove nitrogen from the processing chamber. One or more pump-purge cycles may be used to further remove any trace nitrogen gas from the processing chamber. In one embodiment of a pump-purge cycle, the chamber is partially filled with an inert gas, such as argon, up to approximately 10 Torr, and then the chamber is evacuated down to a pressure of approximately 0.1 Torr or less. The chamber may then be filled with a desired gas environment to a desired pressure. For example, the processing chamber may be filled with dry argon or another gas or gas mixture, preferably not including nitrogen, to a pressure of 100 to 700 Torr. The processing chamber may include heating element(s) that may heat the interior of the chamber and the one or more interconnects to an elevated temperature, such as 450-600° C. (e.g., 540-570° C.).

In step 206 of method 200, an oxidizing gas comprising water vapor is introduced into the processing chamber, such as via a gas distribution manifold in the processing chamber and/or the retort, as described above. Step 206 may begin when the processing chamber temperature reaches at least 450° C. in one embodiment. The oxidizing gas is preferably at least substantially free of nitrogen (i.e., no nitrogen is intentionally added). In one embodiment, a carrier gas such as argon, may be bubbled through a water container so that water vapor is carried into the chamber, distributed through a manifold within the retort and introduced to the interconnects. Besides argon, other carrier gases may be utilized, such as other inert gases (e.g., helium, neon, etc.) or other gases or gas mixtures that preferably do not contain nitrogen (e.g., other inert gas).

In step 208 of method 200, the at least one interconnect is oxidized in the presence of the oxidizing gas comprising water vapor at an elevated temperature. Preferably, the processing chamber temperature is increased to at least 800° C. after step 206 to begin the oxidation of the interconnect in step 208. In an alternative embodiment, steps 206 and 208 are conducted at the same time rather than sequentially, such that the oxidizing gas comprising water vapor is introduced into the processing chamber after the processing chamber temperature reaches at least 800° C.

In embodiments, the at least one interconnect may be oxidized to at least partially fill pores within the interconnect (s) and coat the outside surfaces of the interconnect(s) with one or more oxide material(s) (e.g., $Cr_2O_3$). In embodiments, the at least one interconnect may be oxidized in a sub-atmospheric environment (i.e., less than 760 Torr, such as 100-700 Torr). The oxidation step may be performed for 12 to 72 hours at a peak temperature between about 800-1300° C., such as 850-1200° C.

The water vapor serves as a source for oxygen for the controlled oxidation of the interconnect(s). In embodiments, the water vapor may be the exclusive oxygen source for the oxidation of the interconnect(s). In other embodiments, one or more other sources of oxygen (e.g., $O_2$ gas) may be provided in addition to the water vapor. Preferably, water vapor comprises at least 75 volume percent of the oxygen containing component of the oxidizing gas, such as 80-100% and the other oxygen sources (e.g., oxygen gas) comprise 25 volume percent or less, such as 0-20% of the oxygen containing component of the oxidizing gas. The above ratios exclude the oxygen free carrier gas (e.g., argon) component of the oxidizing gas and it should be understood that the carrier gas volume percent of the oxidizing gas may be larger or smaller than water vapor volume of the oxidizing gas. By performing the controlled oxidation in an environment that is free of intentionally introduced nitrogen-containing gases (e.g., air), nitride formation on the interconnect(s) may be inhibited.

Performing the oxidation in a sub-atmospheric environment (e.g., 100-700 Torr) may improve uniformity in the simultaneous oxidation of a plurality of interconnects in the process chamber (e.g., vacuum furnace). Furthermore, the sub-atmospheric environment may enable a plurality of interconnects to be stacked in "columns" during the high-temperature oxidation process without becoming warped or otherwise damaged.

Following oxidation, the at least one interconnect may be cooled in step 210. In one embodiment, the carrier gas/water vapor mixture (e.g., oxidizing gas) may continue to flow into the processing chamber during the initial cool down period (e.g., as the temperature is reduced to below 700° C., such as 600-650° C.). Then, a dry gas (e.g., argon or another inert gas) that lacks intentionally added oxygen containing component (e.g., water vapor, oxygen gas, etc.) may flow into the chamber as the temperature is further reduced. For example, the argon gas may be provided to the processing chamber without first passing through a water filled gas bubbler. The pressure within the chamber may be increased (e.g., up to atmospheric pressure) to accelerate cool down to a lower temperature, such as room temperature. The oxidized interconnect(s) may be removed from the processing chamber in step 212.

Figure 3A:
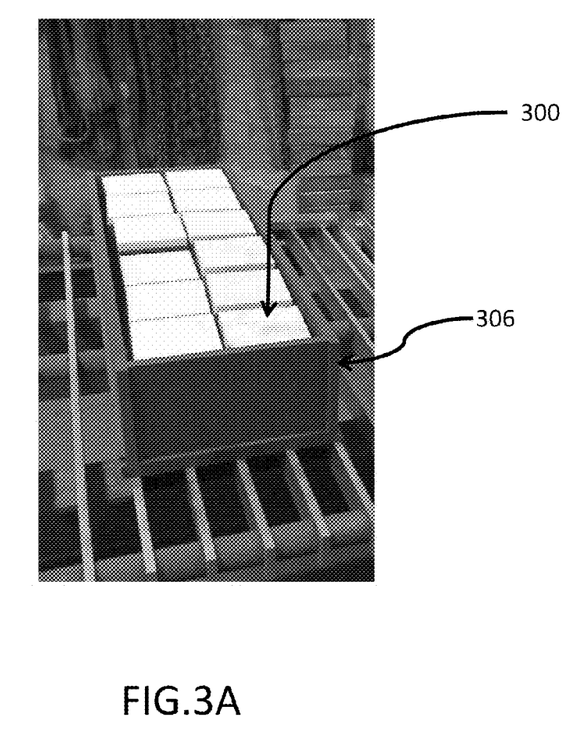
FIGS. 3A-3D are photographs of a system for performing a controlled oxidation of a plurality of interconnects using water vapor.
Figure 3B:
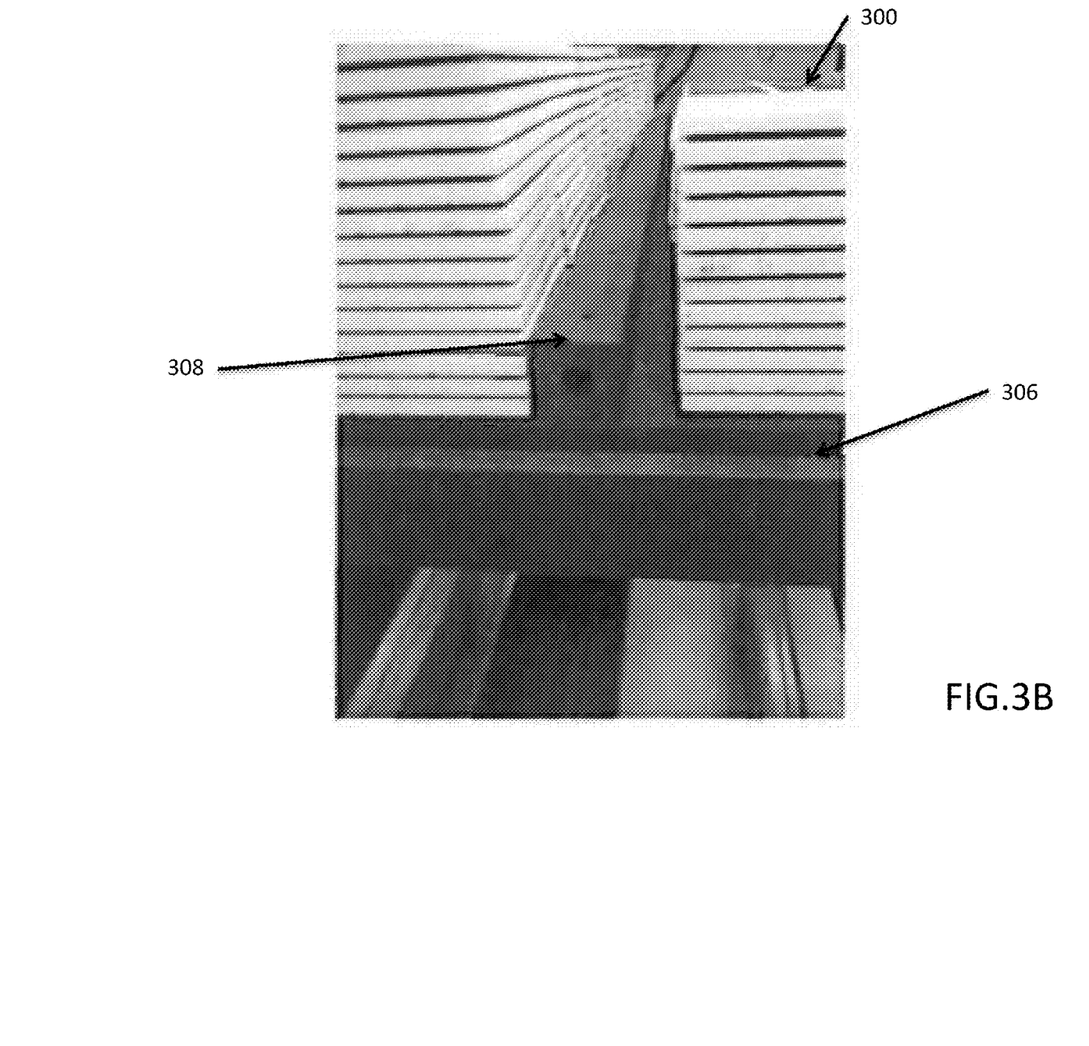

FIGS. 3A-3D illustrate a system for performing a controlled oxidation of a plurality of interconnects, such as the interconnects 9 shown in FIG. 1. FIG. 3A illustrates an example of a plurality of interconnects stacked into columns 300. Each column 300 includes a plurality of interconnects interleaved with ceramic tiles. The columns 300 are arranged within a partially assembled container 306 formed from a high-temperature material, such as graphite. The container 306 (e.g., retort) also includes a lid (not shown) that may be positioned over the top of the container to enclose the interconnect columns 300 within the container. As shown in FIG. 3B, the container 306 includes a gas distribution manifold 308 that may be coupled to one or more gas sources for providing a gas or gas mixture comprising water vapor (e.g., oxidizing gas comprising a carrier gas and water vapor mixture) to the plurality of interconnects to perform a controlled oxidation of the interconnects. The manifold 308 may be coupled to the gas source(s) by any suitable conduit, such as a gas tight tube or hose.

Figures 3C, 3D:
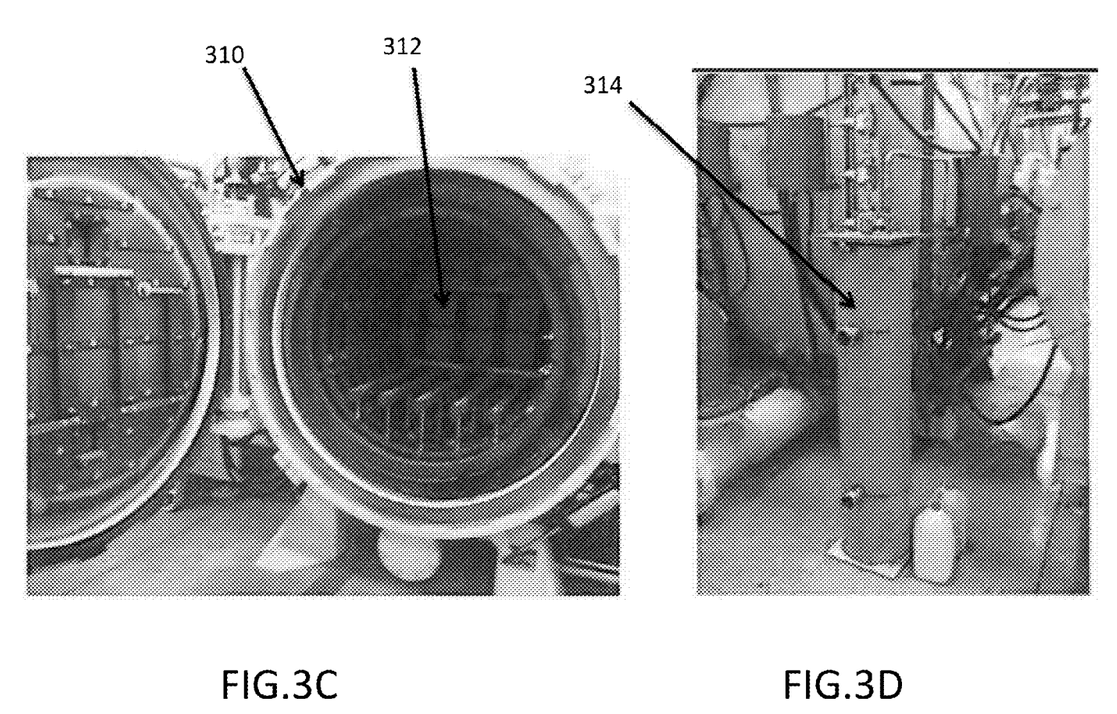

To perform an oxidation process, the container 306 is loaded into a vacuum furnace 310, such as shown in FIG. 3C. The vacuum furnace 310 may be operable to control the temperature and/or pressure within a processing chamber 312 of the furnace 310. The vacuum furnace 310 may include conduits to enable gases from one or more gas sources to be controllably introduced to and evacuated from the processing chamber 312. At least a portion of the gas may be introduced to the chamber via the gas distribution manifold 308 in the container 306.

A gas bubbler 314 may be located external to the vacuum furnace 310, as shown in FIG. 3D, and may be coupled via suitable conduit(s) to the gas distribution manifold 308 in the container 306. The gas bubbler 314 may contain water, such as liquid water. A carrier gas (e.g., argon) may be selectively flowed from a gas source (e.g., gas tank) through the gas bubbler 314 into the processing chamber 312 of the vacuum furnace 310 and then through the gas distribution manifold 308 in the container 306 so that water vapor flows over, under and between the stacked interconnects. The water vapor may serve as an oxidant source for an oxidation process of the interconnects, as described above.

Figure 4:
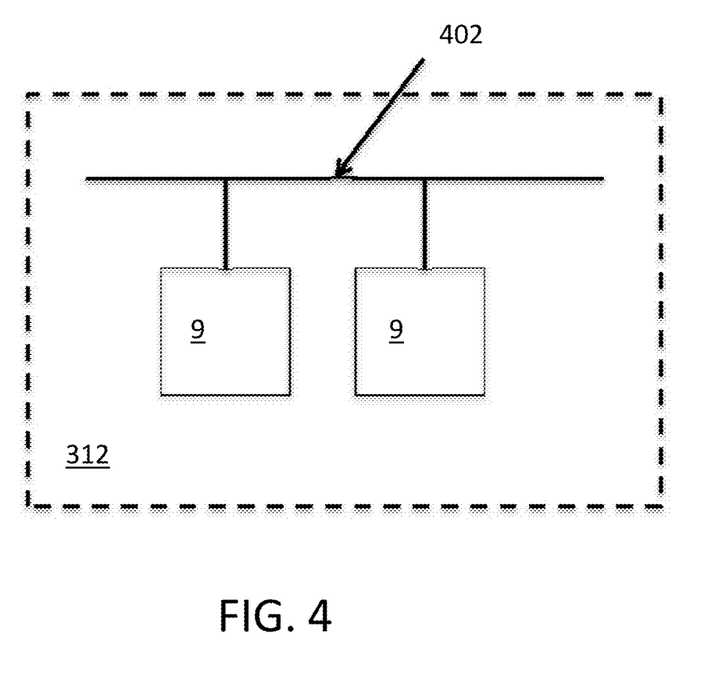
FIG. 4 schematically illustrates a support apparatus for hanging interconnects within a processing chamber for oxidizing the interconnects.

While various embodiments of an oxidation method for interconnects have been described in which a plurality of interconnects are vertically stacked in columns 300, alternative arrangements of the interconnects during the oxidation process may also be utilized. FIG. 4 illustrates an embodiment in which a plurality of interconnects 9 are hung by their edges by a suitable support apparatus 402, which may be similar to a clothes line for drying clothes, within the processing chamber 312.

While solid oxide fuel cell interconnects, end plates, and electrolytes were described above in various embodiments, embodiments can include any other fuel cell interconnects, such as molten carbonate or PEM fuel cell interconnects, or any other metal alloy or compacted metal powder or ceramic objects not associated with fuel cell systems.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step of any embodiment described herein can be used in any other embodiment.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method for oxidizing metal interconnect for a fuel cell stack, comprising:
   introducing at least one metal interconnect to an oxidizing gas comprising water vapor, the oxidizing gas being at least substantially free of nitrogen; and
   oxidizing the at least one metal interconnect in the presence of the oxidizing gas at elevated temperature, wherein the oxidation is performed at a sub-atmospheric pressure that is between about 100 and about 700 Torr, and
   incorporating the at least one metal interconnect into a solid oxide fuel cell stack following the step of oxidizing.

2. The method of claim 1, wherein the oxidizing gas comprises water vapor and a carrier gas for conveying the water vapor to the at least one metal interconnect.

3. The method of claim 2, wherein the carrier gas comprises at least one of argon, helium, neon, an inert gas and a non-nitrogen containing gas.

4. The method of claim 2, further comprising:
bubbling the carrier gas through a water source to produce the oxidizing gas comprising water vapor.

5. The method of claim 1, wherein the oxidation is performed at a peak temperature of between about 800° C. and about 1300° C.

6. The method of claim 5, wherein the oxidation is performed at a peak temperature of between about 850° C. and about 1200° C.

7. The method of claim 1, wherein the oxidation is performed for between about 12 and about 72 hours.

8. The method of claim 1, wherein the oxidation is performed in a nitrogen-free environment to inhibit nitride formation on the at least one metal interconnect.

9. The method of claim 1, wherein a plurality of metal interconnects are simultaneously oxidized.

10. The method of claim 9, further comprising:
stacking the plurality of metal interconnects into at least one column;
positioning the at least one column into a container; and
providing the oxidizing gas into the interior of the container to introduce the oxidizing gas to the metal interconnects.

11. The method of claim 10, wherein the oxidizing gas is provided into the interior of the container using a gas distribution manifold.

12. The method of claim 10, further comprising:
loading the container into a vacuum furnace after the step of positioning; and
raising a temperature in the vacuum furnace above 800° C. to oxidize the at least one metal interconnect during or after the step of providing.

13. The method of claim 9, further comprising:
hanging the interconnects in a processing chamber such that the metal interconnects are exposed to the oxidizing gas.

14. A method for oxidizing metal for a fuel cell stack, comprising:
introducing at least one metal interconnect to an oxidizing gas comprising water vapor, the oxidizing gas being at least substantially free of nitrogen; and
oxidizing the at least one metal interconnect in the presence of the oxidizing gas at elevated temperature at a sub-atmospheric pressure that is between about 100 and about 700 Torr, wherein the oxidation is performed in a processing chamber, the method further comprising:
evacuating the processing chamber to remove nitrogen from the chamber prior to oxidizing the at least one interconnect, and
incorporating the at least one metal interconnect into a solid oxide fuel cell stack following the step of oxidizing.

15. The method of claim 14, wherein the processing chamber is evacuated to a pressure that is less than about 0.1 Torr.

16. The method of claim 14, further comprising:
performing at least one pump purge cycle to remove trace nitrogen.

17. The method of claim 14, further comprising:
following the evacuation, filling the processing chamber with the oxidizing gas to introduce the at least one metal interconnect to the oxidizing gas.

18. A method for oxidizing metal interconnect for a fuel cell stack, comprising:
introducing at least one metal interconnect to an oxidizing gas comprising water vapor, the oxidizing gas being at least substantially free of nitrogen; and
oxidizing the at least one metal interconnect in the presence of the oxidizing gas at elevated temperature at a sub-atmospheric pressure that is between about 100 and about 700 Torr, and
incorporating the at least one metal interconnect into a solid oxide fuel cell stack following the step of oxidizing,
wherein:
the at least one metal interconnect comprises a chromium-iron alloy comprising 4-6 wt % iron and 94-96 wt % chromium;
the at least one metal interconnect is made by powder metallurgy and sintering; and
the step of oxidizing is performed for a period sufficient to at least partially fill pores in the at least one metal interconnect with oxide material.

\* \* \* \* \*